(12) United States Patent
Ciano et al.

(10) Patent No.: US 11,283,806 B2
(45) Date of Patent: Mar. 22, 2022

(54) ADAPTIVE SECURITY SYSTEM

(71) Applicant: International Business Machines Corporation, Armonk, NY (US)

(72) Inventors: Giuseppe Ciano, Rome (IT); Randa Salem, Rome (IT); Armando Panniello, Rome (IT); Damiano Vesperini, Rome (IT); Davide Di Meco, Rome (IT)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/532,537

(22) Filed: Aug. 6, 2019

(65) Prior Publication Data
US 2021/0044591 A1    Feb. 11, 2021

(51) Int. Cl.
*G06F 9/451* (2018.01)
*H04L 29/06* (2006.01)

(52) U.S. Cl.
CPC ............ *H04L 63/102* (2013.01); *G06F 9/453* (2018.02)

(58) Field of Classification Search
CPC ....................................................... G06F 9/451
See application file for complete search history.

(56) References Cited

U.S. PATENT DOCUMENTS

| | | | |
|---|---|---|---|
| 9,230,560 B2 | 1/2016 | Ehsani et al. | |
| 10,409,969 B2* | 9/2019 | Hase | G06F 3/1222 |
| 2011/0307403 A1* | 12/2011 | Rostampour | G06Q 50/265 |
| | | | 705/325 |
| 2012/0016678 A1 | 1/2012 | Gruber | |
| 2014/0143149 A1* | 5/2014 | Aissi | G06F 21/629 |
| | | | 705/44 |
| 2014/0359651 A1* | 12/2014 | Lee | G06F 3/017 |
| | | | 725/25 |
| 2017/0163435 A1 | 6/2017 | Ehsani et al. | |
| 2017/0169819 A1 | 6/2017 | Mese et al. | |
| 2018/0233147 A1* | 8/2018 | Tukka | G06F 3/167 |
| 2018/0367480 A1* | 12/2018 | Housman | G06F 40/216 |

OTHER PUBLICATIONS

Ospan et al., "Context Aware Virtual Assistant with Case-Based Conflict Resolution in Multi-User Smart Home Environment", Second International Conference on Computing and Network Communications (CoCoNet' 18), © 2018 IEEE, 9 pages.
Mell et al., "The NIST Definition of Cloud Computing", U.S. Department of Commerce, Special Publication 800-145, Sep. 2011, 7 pages.

* cited by examiner

*Primary Examiner* — Di Xiao
(74) *Attorney, Agent, or Firm* — William H. Hartwell; Isaac J. Gooshaw

(57) ABSTRACT

A security system executing on an intelligent assistant is provided. A computing device receives communicated data from a user within a threshold level of proximity of an intelligent assistant. A computing device determines an identity of the user based, in part, on the communicated data. Responsive to a computing device (i) analyzing the communicated data and (ii) a history of interactions between the user and an authorized user of the intelligent assistant, the one or more processors generate a predicted response of the authorized user to the communicated data. A computing data communicated the predicted response to the user via the intelligent assistant.

17 Claims, 6 Drawing Sheets

ADAPTIVE SECURITY SYSTEM

BACKGROUND OF THE INVENTION

The present invention relates generally to the field of computer security, and more particularly to intelligent assistants.

The proliferation of intelligent assistants has enhanced the capability for users to dictate tasks and services. In addition, this enhancement of dictation of tasks and services has been enriched by allowing users to use speech to dictation. Users can direct questions towards the intelligent assistants, control home devices, request media playback, as well as various other requests. However, the use of intelligent assistants is not limited to defined users, and it can become difficult to control access to the intelligent assistants.

SUMMARY

Embodiments of the present invention provide a method, system, and program product of a security system executing on an intelligent assistant.

A first embodiment encompasses a method for a security system executing on an intelligent assistant. One or more processors receive communicated data from a user within a threshold level of proximity of an intelligent assistant. The one or more processors determine an identity of the user based, in part, on the communicated data. Responsive to (i) an analysis of the communicated data and (ii) a history of interactions between the user and an authorized user of the intelligent assistant, the one or more processors generate a predicted response of the authorized user to the communicated data. The one or more processors communicate the predicted response to the user via the intelligent assistant.

A second embodiment encompasses a computer program product for a security system executing on an intelligent assistant. The computer program product includes one or more computer-readable storage media and program instructions stored on the one or more computer-readable storage media. The program instructions include program instructions to receive communicated data from a user within a threshold level of proximity of an intelligent assistant. The program instructions include program instructions to determine an identity of the user based, in part, on the communicated data. Responsive to (i) an analysis of the communicated data and (ii) a history of interactions between the user and an authorized user of the intelligent assistant, the program instructions include program instructions to generate a predicted response of the authorized user to the communicated data. The program instructions include program instructions to communicate the predicted response to the user via the intelligent assistant.

A third embodiment encompasses a computer system for a security system executing on an intelligent assistant. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to receive communicated data from a user within a threshold level of proximity of an intelligent assistant. The program instructions include program instructions to determine an identity of the user based, in part, on the communicated data. Responsive to (i) an analysis of the communicated data and (ii) a history of interactions between the user and an authorized user of the intelligent assistant, the program instructions include program instructions to generate a predicted response of the authorized user to the communicated data. The program instructions include program instructions to communicate the predicted response to the user via the intelligent assistant.

DETAILED DESCRIPTION

Figure 1:
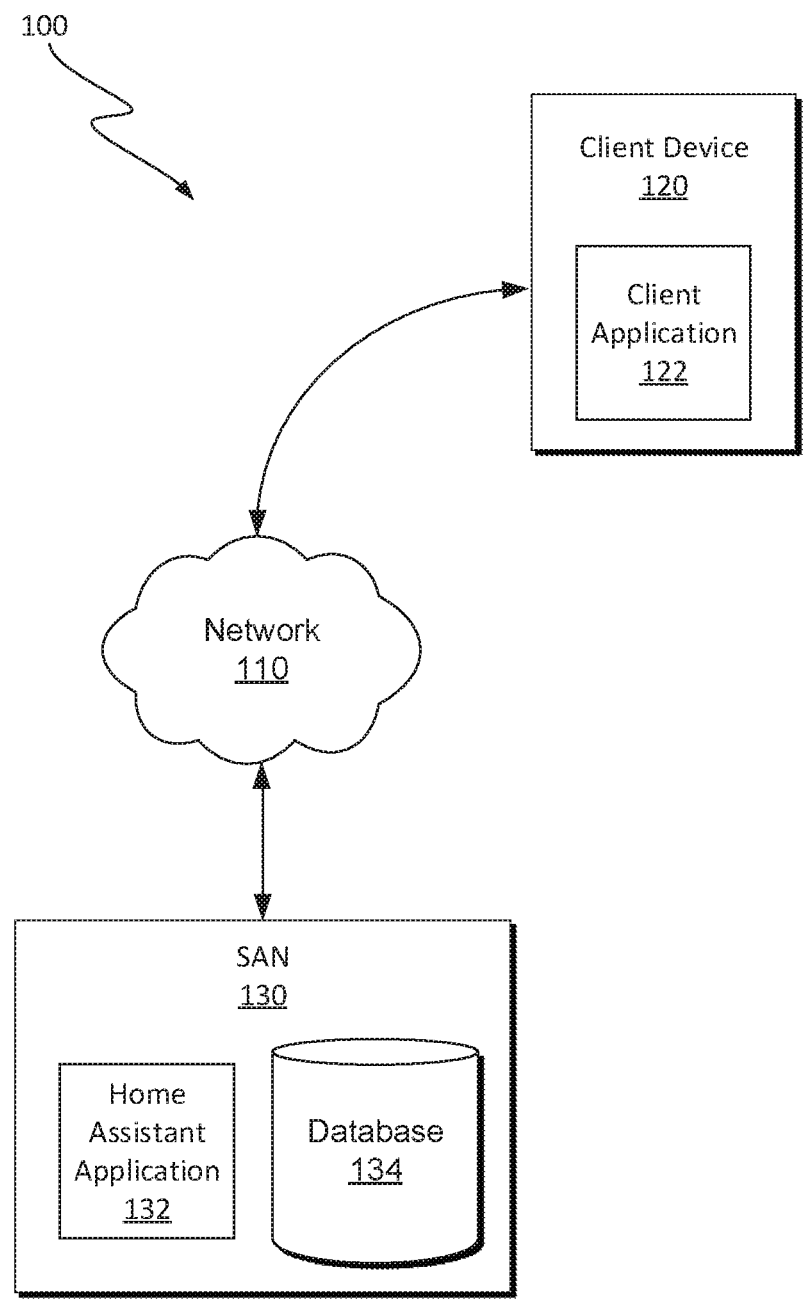
FIG. 1 is a functional block diagram illustrating a computing environment, in which a security system executes on an intelligent assistant, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

While possible solutions to intelligent assistant security system are knowns these solutions may be inadequate to maintain the safety and the integrity of the data accessible through the intelligent assistant, because these solutions often do not contain a security system or may still be accessible by any user without requiring authorization. While it is important that an intelligent assistant recognize and understand requests and/or commands to determine the content the user is attempting to access, it is also advantageous that the primary user be able to authorize certain users and prevent others from using the intelligent assistant.

In general, intelligent assistants are software applications that operate using text, voice or using images received by a user to perform tasks or services for individual based on commands. The intelligent assistant often analyzes the data received and determines the output data the user is requesting. Generally, the intelligent assistant performs a task or service, such as, instant messaging, playing music, generating locational directions, providing information such as weather, etc.

Embodiments of the present invention recognize that certain intelligent assistant may not provide an adequate security system for unwanted users. Embodiments provide intelligent assistant systems that increase security by generating policy measures that can prevent unwanted users from utilizing the intelligent assistant and/or by limiting access to data for secondary users and determining when additional security measures are required to authorize the request for the secondary users. Such additional security measures include, but are not limited to, accessing social media channels and analyzing the relationship between the privileged requestor (i.e., primary owner and/or user of the intelligent assistant) and determining whether the privileged requestor would, i.e., is predicted to, approve of the request by the secondary user based, at least in part, on the analyzation of the relationship from the social media channels. Embodiments recognize that a lack of security could allow unwanted users to access content and communicate unwanted requests to the intelligent assistant that include, but are not limited to, communicating unwanted purchases or communicating too large of a purchase.

In some embodiments, an enhanced level of security offers additional safety measures for intelligent assistants to analyze and determine whether a user is authorized by leveraging policy decisions and social media channels in that determination. Instead of allowing any and/or all users access to the intelligent assistant, the use of a security system creates an improved safety feature for intelligent assistants. When such an intelligent assistant leverages policy decisions established by the privileged user and/or social media channels to determine the relationship between the privileged user and a secondary user, then the intelligent assistant can authorize secondary users without the requirement of the privileged user present during the request by the secondary user. Such an approach often yields in an increase in the level of safety in intelligent assistants and can add a level of autonomy to the users of the intelligent assistant.

In one embodiment, a computing device receives communicated data from a user within a threshold level of proximity of an intelligent assistant. Home assistant application 132 determines the identity of the user based, in part, on the communicated data. Responsive to home assistant application 132 (i) analyzing the communicated data and (ii) the history of interactions between the user and an authorized user of the intelligent assistant (i.e., client device 120), home assistant application 132 generates a predicted response to the authorized user of the communicated data. The predicted response is communicated to the user via the intelligent assistant, wherein, home assistant application 132 communicates the predicted response to client application 122 with program instructions to communicate the predicted response utilizing, at least, installed or peripheral wired or wireless speakers.

In one embodiment, an intelligent assistant (i.e. client device 120) monitors for one or more users of the intelligent assistant. In various embodiments, client device 120 communicates communicated data to home assistant application 132. Alternatively, home assistant application 132 communicates a set of instructions instructing client device 120 to transmit the communicated data to home assistant application 132. Home assistant application 132 identifies that the communicated data comprises (i) a data request, (ii) one or more policy decisions, and (iii) one or more environment data. Home assistant application 132 identifies one or more users, based on the communicated data, is associated with, at least, (i) a privileged requestor, (ii) one or more secondary requestors or (iii) one or more unidentifiable requestors. Home assistant application 132 authorizes the privileged requestor with limitless access to the data stored on the intelligent assistant. Home assistant application 132 authorizes one or more secondary requestors with limited access to the intelligent assistant based, at least in part, on the communicated data received by the privileged requestor. Home assistant application 132 denies one or more unidentifiable requestors, wherein the intelligent assistant communicates a challenge question to the one or more unidentifiable requestors to authorize the one or more unidentifiable requestors.

In one embodiment, home assistant application 132 receives data, communicated from the privileged requestor. Home assistant application 132 analyzes the communicated data. Home assistant application 132 identifies (i) the content of the communicated data and (ii) one or more secondary requestors that the communicated data is directed towards. One or more policy decisions are generated by home assistant application 132 that are associated with (i) the content of the communicated data and (ii) one or more secondary requestors that the communicated data is directed towards. Home assistant application 132 stores the one or more policy decisions on a database (i.e., database 134).

In one embodiment, home assistant application 132 receives communicated data from one or more users that are associated with (i) a privileged requestor, (ii) one or more secondary requestors, or (iii) one or more unidentifiable requestors. Home assistant application 132 identifies the identity of the, at least, first user that is associated with (i) one or more secondary requestors or (ii) one or more unidentifiable requestors. Responsive to home assistant application 132 identifying the identity of the, at least, first user, home assistant application 132 identifies one or more policy decisions that are directed towards the, at least, first user. Home assistant application 132 retrieves the one or more identified policy decisions from a database (i.e., database 134). Home assistant application 132 determines based, at least in part, on (i) the data request from the first user and (ii) the identified one or more policy decisions, whether or not to authorize the first user.

In one embodiment, home assistant application 132 identifies communicated data from the, at least, first user is a data request. Home assistant application identifies that one or more policy decisions are directed towards the, at least, first user. Home assistant application 132 analyzes (i) the identified one or more policy decisions and (ii) the data request. Responsive to home assistant application 132 analyzing (i) the identified one or more policy decisions and (ii) the data request, home assistant application 132 determines that the, at least, first user is authorized based, at least in part, on (i) the identified one or more policy decisions and (ii) the data request. Home assistant application 132 communicates a predicted response to client application 122 to be communicated to the, at least, first user, indicating the data request is approved. Additionally, home assistant application 132 communicates a set of program instructions instructing client application 122 to communicate the predicted response to the, at least, first user utilizing, at least, installed or peripheral wired or wireless microphones.

In one embodiment, home assistant application 132 determines that the first user is the source of the communicated data is not authorized based, at least, in part on (i) the data request from the, at least, first user and (ii) the identified one or more policy decisions. Home assistant application 132 identifies a social media connection between (i) the privileged requestor and (ii) the, at least, first user. Home assistant application 132 retrieves one or more social media channels between (i) the privileged requestor and (ii) the, at least, first user. Home assistant application 132 analyzes one or more social media contents of the social media channels between (i) the privileged requestor and (ii) the, at least, first user.

In one embodiment, responsive to home assistant application 132 analyzing one or more social media contents of the social media channels between (i) the privileged requestor and (ii) the, at least, first user, home assistant application 132 determines whether or not to authorize the data request from the, at least, first user based, at least in part, on the one or more social media contents of the social media channels between (i) the privileged requestor and (ii) the, at least, first user. Home assistant application 132 authorizes the data request by the, at least, first user. Home assistant application 132 stores the authorization for the data request by the, at least, first user on a database (i.e., database 134). Home assistant application 132 identifies a predicted response to the data request by the, at least, first user. Home assistant application 132 executes the data request by the, at least, first user, and communicates the predicted response to the, at least, first user, indicating that the data request is approved.

The present invention will now be described in detail with reference to the Figures.

FIG. 1 is a functional block diagram illustrating a computing environment, generally designated 100, in accordance with one embodiment of the present invention. Computing environment 100 includes client device 120 and storage area network (SAN) 130 connected over network 110. Client device 120 includes client application 122. SAN 130 includes home assistant application 132 and database 134.

In various embodiments of the present invention, client device 120 is a computing device that can be a standalone device, a server, a laptop computer, a tablet computer, a netbook computer, a personal computer (PC), a personal digital assistant (PDA), smartwatch, smartphone, smart speaker, smart house, a desktop computer or any programmable electronic device capable of receiving, sending, and processing data. In general, client device 120 represents any programmable electronic device or combination or programmable electronic devices capable of executing machine readable program instructions and communication with SAN 130. In another embodiment, client device 120 represents a computing system utilizing clustered computers and components to act as a single pool of seamless resources. In general, client device 120 can be any computing device or a combination of devices with access to SAN 130 and network 110 and is capable of executing client application 122. Client device 120 may include internal and external hardware components, as depicted and described in further detail with respect to FIG. 1. Client device 120 includes software and hardware components that represent, but are not limited to, speakers, microphones, audio signal processors, and/or other integrated and peripheral devices that are connected to a given computing system.

In this exemplary embodiment, client application 122 is stored on client device 120. However, in other embodiments, client application 122 may be stored externally and accessed through a communication network, such as network 110. Network 110, can be, for example, a local area network (LAN), a wide area network (WAN) such as the internet, or a combination of the two, and may include wired, wireless, fiber optic or any other connection known in the art. In general, network 110 can be any combination of connections and protocols that will support communications between client device 120 and SAN 130, in accordance with a desired embodiment of the present invention.

Client device 120 includes an interface that provides an interface between client device 120 and SAN 130, over network 110. In some embodiments, the interface can be a graphical user interface (GUI), a web user interface (WUI), or a voice user interface (VUI) and can present text, documents, web browser, windows, user options, application interfaces, text to speech, sounds, tones, and instructions for operation, and includes the information (such as graphic, text, and sound) that a program presents to a user and the control sequences the user employs to control the program. In some embodiments, client device 120 accesses data communicated from client application 122 and/or San 130 via client-based application that runs on client device 120. For example, client device 120 includes home automation software that provides an interface between client device 120, San 130, other various networks (not shown), and other various computing devices (not shown) that are connected via network 110.

In various embodiments of the present invention, client application 122 operates on client device 120. In another embodiment, client application 122 operates on another computing device (not shown). Client application 122 represents one or more of, but is not limited to, sensors, microphones, speakers, computing programs, or any combination thereof, that collects data from a user of client device 120 (herein after "requestor"). In various embodiments, client application 122 receives a series of words and/or phrases from a requestor and utilizes a speech to text program to collect the data and store the data on database (e.g., database 134). In some embodiments, client application 122 utilizes a word processor and a speaker to communicate data to the requestor based, at least, in part, on the data client application 122 received from the requestor.

Storage area network (SAN) 130 is a storage system that includes home assistant application 132 and database 134. SAN 130 may include one or more, but is not limited to, computing devices, server-cluster, database and storage devices. SAN 130 operates to communicate with client device 120 and other various computing devices (not shown) over a network, such as network 110. For example, SAN 130 communicates with client application 122 to transfer data between, but is not limited to, database 134 and various other databases (not shown) that are connected to network 110. In general, SAN 130 can be any computing device or a combination of devices that are communicatively connected to a local IoT network, i.e., a network comprised of various computing devices including, but is not limited to client device 120 to provide the functionality described herein. SAN 130 can include internal and external hardware components as described with respect to FIG. 4. The present invention recognizes that FIG. 1 may include any number of computing devices, servers, databases and/or storage devices, and the present invention is not limited to only what is depicted in FIG. 1. As such, in some embodiments, some of the features and functions of client device 120 are included as part of SAN 130 and/or another computing device.

Additionally, in some embodiments, SAN 130 represents a cloud computing platform. Cloud computing is a model or service delivery for enabling convenient, on demand network access to a shared pool of configurable computing resources (e.g., networks, network bandwidth, servers, processing, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including platform as a service (PaaS) model, an infrastructure as a service (IaaS) model, and a software as a service (SaaS) model; and can be implemented as various deployment models including a private cloud, a community cloud, a public cloud, and a hybrid cloud.

In various embodiments, SAN 130 represents a local IoT network. In the embodiment depicted in FIG. 1, home assistant application 132 are respectively stored on and executed by SAN 130. In other embodiments, client application 122 can store and/or execute a different count of applications without departing from the scope of the present invention. In general, home assistant application 132 operate to transmit respective data to SAN 130, as described herein. Additionally, home assistant application 132 operates to notify, via network 110, client device 120 and other various computing devices (not shown) of conditions and/or respective action events that may occur within SAN 130. In one example, home assistant application 132 takes the form of a well-being monitoring application that utilizes elements of SAN 130 to monitor data transmitted from client device 120 and various other computing devices (not shown) regarding the status of music playback request, directions request, purchase request, but are not limited hereto. These examples will be referenced in various embodiments herein to illustrate various aspects of the present invention, but the present invention is not to be construed as being limited to such embodiments. In some embodiments IoT applications executing on SAN 130 can also include analytics logic to analyze data from one or more gateways to facilitate optimization of device configuration of device configuration rules, template rules, and other logical operations utilized by the gateway(s), as described herein.

In various embodiments, SAN 130 is depicted in FIG. 1 for illustrative simplicity. However, it is to be understood that, in various embodiments, SAN 130 includes any number of databases that are managed in accordance with the functionality of home assistant application 132. In general, database 134 represents data and home assistant application 132 manages the ability to view the data. In other embodiments, home assistant application 132 represents code that provides the ability to take specific action with respect to another physical or virtual resource and home assistant application 132 manages the ability to use and modify the data. Client application 122 can also represent any combination of the aforementioned features, in which server application 132 has access to database 134. To illustrate various aspects of the present invention, examples of client application 122 are presented in which client application 122 represents one or more of, but is not limited to, a local IoT network and security system program.

In this exemplary embodiment, home assistant application 132 and database 134 are stored on SAN 130. However, in another embodiment, home assistant application 132 and database 134 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between client device 120, SAN 130, and various other computing devices (not shown) in accordance with a desired embodiment of the present invention.

In the embodiment depicted in FIG. 1, home assistant application 132, at least, in part, has access to client application 122 and can communicate data stored on SAN 130 to client device 120. Alternatively, client application 122 has access to home assistant application 132 and can communicate data stored on client device 120 and SAN 130. In some embodiments, client device 120 and SAN 130 have access to various other computing devices (not shown) and can communicate data stored, respectively on computing device 120 and SAN 130 to the various other computing devices. For example, client application 122 defines a smart house program of client device 120 that has access to data on database 134 and has access to data on other smart house programs (e.g., various other computing devices).

In various embodiments depicted in FIG. 1, data is, at least in part, data obtained from client application 122. Client application 122 can include, but is not limited to, digital cameras, biometric devices, speakers, microphones, and sound processors. Client application 122 operates to monitor and transmit data from requestors to home assistant application 132.

In some embodiments depicted in FIG. 1, client device 120 represents, but is not limited to, a smart speaker, smart house, and/or smart device, and includes, but is not limited to, client application 122. Additionally, client application 122 operates to collect data from requestors of client device 120, as described above, and home assistant application 132 operates to analyze the data obtained from client application 122 to determine the applicable response to be communicated to the requestor of client device 120. In general, home assistant application 132 operates to control access to data stored on database 134 and/or approve or deny actions made by the requestor of client device 120. Additionally, home assistant application 132 operates to analyze the data obtained from client application 122 in conjunction with data obtained from SAN 130 (i.e., data communicated from various other computing devices) and operate to communicate a response based, at least in part, on the request made by the requestor of client device 120.

In various embodiments of the present invention, home assistant application 132 is capable of receiving any form of input (i.e., data) from client application 122, wherein a user of client device 120 communicated data to client device 120. Home assistant application 132 is capable of receiving data in the form of including, but not limited to, text, speech, video, images, etc. In some embodiments, home assistant application 132 receives this data in any form of input from a privileged requestor. Additionally, in some embodiments, home assistant application 132 receives this data in any form of input from (i) one or more secondary requestor and/or (ii) one or more unidentifiable requestors. One having ordinary skill in the art would understand that for home assistant application 132 to receive and identify data in various formats, home assistant application 132 utilizes technology that includes, but is not limited to, voice recognition, voice pattern matching technology, image recognition technology, etc.

In various embodiments, home assistant application 132 receives a data request from, at least, one unidentifiable requestor. Home assistant application 132 utilizing technology, as described above, determines that the identity of the unidentifiable requestor cannot be ascertained. Home assistant application 132 based, at least in part, on not being able to ascertain the identity of the unidentifiable requestor, generates a challenge question. The challenge question includes, but is not limited to, (i) one or more challenge questions generated by the privileged requestor, and (ii) one or more challenge questions generated in view of personally identifying information of the privileged requestor, wherein, at least, the privileged requestor and/or one or more secondary requestors would understand and be capable of communicating a response to the challenge question. Upon receiving a response to the challenge question, home assistant application 132 analyzes the response to the challenge question and determines whether the response verifies the identity of the unidentifiable requestor. In various embodiments, home assistant application 132 cannot verify the response to the challenge question and determines not to authorize the data request communicated by the unidentifiable requestor. In some embodiments, home assistant application 132 can verify the response to the challenge question and determines to authorize the data request communicated by the unidentifiable requestor based, at least in part, on identifying the unidentifiable requestor as (i) the privileged requestor or (ii) at least, a secondary requestor.

In various embodiments of the present invention, home assistant application 132 operates to generate message that include, but are not limited to, (i) one or more denial messages, (ii) one or more approved messages, or (iii) one or more predicted responses for the privileged user to a data request. In general, a predicted response for the privileged user is generated based on a course of action that home assistant application 132 predicts the privileged user would take if the privileged user were to be presented with the facts of the scenario in question. In some scenarios and fact patterns, home assistant application 132 may predict that the privileged user would deny a given request. In other scenarios and fact patterns, home assistant application 132 may predict that the privileged user would allow a given request. As such, home assistant application 132 functions to act on behalf of the privileged user based on how the privileged user is predicted to respond in that given scenario. In various embodiments, home assistant application 132 generates one or more denial messages based, at least in part, on home assistant application being unable to (i) authorize the data request communicated by, at least, one secondary requestor based, at least in part, on one or more policy decisions and/or (ii) identify the identity of the requestor who is the source of the communicated data request. In some embodiments, home assistant application 132 generates (i) one or more approved messages and/or (ii) one or more predicted responses to a data request based, at least in part, on home assistant application 132 authorizing the data request communicated by (i) the privileged requestor or (ii) one or more secondary requestors.

In various embodiments of the present invention, home assistant application 132 (*i*) identifies the identity of the user of client device 120, (ii) analyzes the data communicated by the user of client device 120, and (iii) determines whether to authorize the data the communicated by the user of client device 120, etc., wherein home assistant application 132 receives the data from client application 122. In some embodiments of the present invention, the user of client device 120 communicates the data to client application 122 operating on client device 120, wherein, client application 122 communicates any and all data to home assistant application 132.

In various embodiments of the present invention, data requests can include, but are not limited, to requests for media playback, directions, online retail purchases, WWW searches, etc. As recognized above, home assistant application 132 is capable of receiving data request in any form of input.

In various embodiments of the present invention, home assistant application 132 generates a predicted response based, at least in part, on the data request communicated by a secondary requestor. In some embodiments, home assistant application 132 receives a data request from, at least, one secondary requestor. Home assistant application 132 accesses a database (i.e., database 134) and retrieves one or more policy decisions. Home assistant application 132 analyzes the one or more policy decisions, and determines whether, at least, one of the one or more policy decisions apply to the data request communicated by the, at least, one secondary requestor. Home assistant application 132 generates a predicted response based, in part, on the (i) data request and (ii) the, at least, one of the one or more policy decisions. If home assistant application 132 determines that one of the one or more policy decisions are directed towards the data request communicated by the, at least, one secondary requestor then home assistant application 132 generates a predicted response that responds to the data request. In one embodiment and example, the, at least, one secondary requestor communicates a data request that indicates media playback of song A. Home assistant application 132 retrieves and analyzes one or more policy decisions to determine whether the, at least, one secondary requestor is authorized for media playback. In response to analyzing the one or more policy decisions and determining that the, at least, one secondary requestor is authorized to request media playback, home assistant application 132 generates a predicted response that, at least, includes a response (i) that articulates that the, at least, secondary requestor is authorized and (ii) communicates the data necessary for media playback to client application 122, with program instructions instructing client application 122 to communicate the response to the, at least, one secondary requestor.

In one embodiment, home assistant application 132 receives data from client application 122 to request access to data and/or to facilitate retail purchases. In some embodiments, client application 122 includes, communicates with, or is included as part of a smart device (i.e., smart house, smart speaker, etc.) that communicates, at least in part, with the requestor of client device 120. Client application 122 communicates data received from the requestor of client device 120 to home assistant application 132. Home assistant application 132 analyzes the request obtained from client application 122 and determines whether to authenticate the requestor based, at least in part, (i) on the request received and (ii) if a defined policy decision exists. For example, home assistant application 132 receives data from client application that the smart device (i.e., client device 120) receives from requestor of client device 120. Home assistant application 132 analyzes the data to determine whether the requestor of client device 120 is an authorized user of the device. One having ordinary skill in the art would understand that the requestor is any living being capable of communicating with client device 120, and, more importantly, is capable of communicating a request as described above. Additionally, home assistant application 132 analyzes the request to determine whether the requestor is authorized to make such a request. In some scenarios, such a determination of authorization is based on a prediction of whether the authorized user would allow the requested activity, e.g., whether the authorized user is predicted to grant permission to perform the requested action.

In various embodiments of the present invention, client device 120 is a computing device that is owned by a privileged requestor (i.e., primary user of client device 120). The present invention recognizes that the privileged requestor has access to data stored on SAN 130 by communicating with client device 120, wherein the privileged requestor communicates a request which includes, but is not limited to, a request for data, request media playback, directions, etc. In some embodiments, the privileged requestor shares personal identifying information which includes, but is not limited to, social media accounts and payment information (e.g., for facilitating a retail purchase). In some embodiments home assistant application 132 requests this data from client application 122. In another embodiment, home assistant application 132 communicates program instructions to client application 122 that instructs client application 122 to communicate the data periodically. One having ordinary skill in the art would understand that periodically means after a specified duration of time (i.e., every four hours), additionally, one having ordinary skill in the art would understand that periodically includes communicating data to home assistant application 132 when a requestor requests data.

In various embodiments of the present invention, various other requestors (i.e., secondary requestors) have access to client device 120. In some embodiments, home assistant application 132 utilizes voice recognition and/or voice pattern matching technology to recognize the identity of the requestor. In another embodiment, client application 122 utilizes voice recognition and/or voice pattern matching to recognize the identity of the requestor. In this embodiment, home assistant application 132 communicates with client application 122 and requests the data be transmitted to home assistant application 132.

In various embodiments, the privileged requestor of client device 120 authorizes a secondary user access to client device 120. Additionally, the privileged requestor can set one or more policy decisions that define the amount of access the secondary requestor is granted. In one embodiment and example, the privileged requestor can set, at least, one policy decision limiting the access of the secondary requestor to media playback requests. In this example and embodiment, client application 122 receives a vocally communicative request from the secondary requestor to play song A. Client application 122 communicates this request to play song A to home assistant application 132. Home assistant application 132 analyzes the request using voice recognition technology and determines that the requestor is a secondary requestor and, more specifically, the secondary requestor is user B. Home assistant application 132 accesses database 134 and retrieves one or more policy decisions defined by the privileged requestor limiting access of secondary users. Home assistant application 132 retrieves a set of one or more policy decisions defined for user B, and home assistant application 132 analyzes the set of one or more policy decisions. Based, at least in part, on the set of one or more policy decisions, home assistant application 132 determines that user B is authorized to request media playback and, more specifically, is authorized to request the playback of song A. Home assistant application 132 communicates the necessary data to client application 122 to play song A utilizing, at least, a speaker located on client device 120.

In one embodiment, a privileged requester of client device 120 vocally communicates with client application 122 and establishes a set of one or more policy decisions to ensure that a security measure is established to prevent unauthorized secondary users from accessing data stored on SAN 130. In various embodiments of the present invention, a privileged requestor establishes one or more policy decisions with regards to accessing data stored on SAN 130 by secondary users. The present invention recognizes that policy decisions include, but are not limited to, accessing financial information, accessing media playback, requesting directions, accessing information available on the worldwide web (WWW), and online retail purchases. Additionally, the privileged requestor communicates to client application 122 one or more policy decisions for each secondary user. In one example and embodiment, client device 120 resides in a household of four, which includes a privileged requestor (i.e., user A) and three secondary users. In this example and embodiment, the privileged requestor authorizes the secondary requestor (i.e., user B) full access to the data stored on SAN 130. In various embodiments, the privileged requestor authorizes user B equal access to data stored on SAN 130 that the privileged requestor has access to. Additionally, in this example, the privileged requestor authorizes limited access (i.e., one or more policy decisions) to the remaining two secondary requestors (i.e., user C and user D). In various embodiments, the privileged requestor authorizes limited access to data stored on SAN 130 by establishing one or more policy decisions. The privileged requestor establishes one or more policy decisions that include, but are not limited to, denying online retail purchases, limiting the value of the online retail purchases, limiting the content of media playback that is requested (i.e., limit media playback based, at least in part, on age and content ratings), and limiting access to the WWW.

In one embodiment and example, home assistant application 132 leverages one or more policy decisions to secure personal identifying information of the privileged requestor. One having ordinary skill in the art would understand that personal identifying information includes, but is not limited to, financial information, name, address, etc. In various embodiments, home assistant application 132 communicates personal identifying information with the privileged requestor. In this embodiment, home assistant application 132 utilizes voice recognition and/or voice pattern matching technology to identify the privileged requestor and allow access to the personal identifying information. In some embodiments, the privileged requestor communicates a policy decision to client application 122, instructing home assistant application 132 to allow a secondary requestor access to the personal identifying information. Additionally, in this embodiment, the privileged requestor allows the secondary requestor to modify and/or change the personal identifying information stored on database 134. In this embodiment and example, home assistant application 132 utilizes voice recognition and/or voice pattern matching to identify the secondary requestor and stores the data identifying the secondary requestor on database 134. Additionally, home assistant application 132 utilizes the voice recognition and/or voice pattern matching to identify the secondary requestor based, at least in part, on the secondary requestor communicating a request to client application 122, wherein client application 122 communicates the request to home assistant application 132.

In various embodiments, a secondary requestor communicates a request to client application 122, wherein client application 122 communicates the request to home assistant application 132. Home assistant application 132 analyzes the request based, at least in part, on (i) voice recognition, (ii) identification of requestor, and (iii) the content of the request. Home assistant application 132 analyzes the request based, at least in part, on voice recognition and voice pattern matching technology, and determines the identity of the requestor. In some embodiments, home assistant application 132 identifies the requestor as the privileged requestor. In various embodiments, home assistant application 132 identifies the requestor as an authorized secondary requestor.

In one embodiment and example, home assistant application 132 receives a request and analyzes the request based, at least in part, on voice recognition and voice pattern matching technology, and determines that the requestor is an unidentifiable requestor. In this embodiment and example, home assistant application 132 generates a request requiring the unidentifiable requestor to identify by name (e.g., user A). Additionally, home assistant application 132 communicates the identifying request to client application 122, and client application 122 utilizing text to speech software and a speaker communicates the identifying request to the unidentifiable requestor. In various embodiments, client application 122 receives a response from the unidentifiable requestor and communicates the response to home assistant application 132. Home assistant application 132 analyzes the response based, at least in part, (i) on the name provided and (ii) voice recognition. In various embodiments, home assistant application 132 determines that the unidentifiable requestor is an authorized requestor (i.e., privileged requestor, or secondary requestor). Home assistant application 132 communicates a challenge question to client application 122 authenticate the authorized requestor. Client application 122 utilizing text to speech software and a speaker, communicates a challenge question to the authorized requestor. In some embodiments, client application 122 receives a response to the challenge question and communicates the response to the challenge question to home assistant application 132, wherein home assistant application 132 authenticates the response to the challenge question by analyzing the response and matching the response to the answer stored on database 134. In various embodiments, home assistant application 132 authenticates the unidentifiable requestor based, at least in part, on the response to the challenge question and identifies the unidentifiable requestor. Home assistant application 132 retrieves the set of one or more policy decisions based, at least in part, on the identification of authenticated requestor, wherein home assistant application 132 analyzes and determines the necessary action based, at least in part, on subsequent requests communicated by the authenticated requestor.

In various embodiments of the present invention, the unidentifiable requestor communicates a response to the challenge question to client application 122, wherein client application 122 communicates the response to home assistant application 132. Home assistant application 132 analyzes the response to the challenge question, as described above. In some embodiments, home assistant application 132 attempts to authenticate the unidentifiable requestor by matching the response to the challenge question to the answer stored on database 134. In this embodiment, home assistant application 132 is unable to authenticate the unidentifiable requestor based, at least in part, on being unable to match the response to the challenge question to the answer stored on database 132. In this embodiment, home assistant application 132 generates a denial message and communicates the denial message to client application 122, wherein client application 122 utilizing text to speech technology and a speaker communicates the denial message to the unidentifiable requestor.

In various embodiments of the present invention, the privileged requestor communicates one or more policy decisions to home assistant application 132. Additionally, the privileged requestor communicates one or more policy decisions establishing that the one or more policy decisions apply to one or more secondary requestors.

In various embodiments, the privileged requestor may communicate one or more policy decisions to home assistant application 132, however it is feasible that the one or more policy decisions communicated by the privileged requestor to home assistant application 132 do not apply to the request made by (i) a secondary requestor or (ii) an unidentifiable requestor. In this embodiment, home assistant application 132 accesses social channels and retrieves data based, at least in part, on the interactions between the privileged requestor and the secondary requestor to determine whether the privileged requestor would approve of a request made by the secondary requestor that is not established in one or more policy decisions.

In some embodiments of the present invention, the privileged requestor does not communicate one or more policy decisions to home assistant application 132. In this embodiment, home assistant application 132 receives a request made by the secondary requestor. Home assistant application 132 accesses database 134 to retrieve one or more policy decisions established by the privileged requestor. Home assistant application 132 identifies that the privileged requestor has not established one or more policy decisions and accesses social channels to determine if the privileged requestor would approve the request made by the secondary requestor. In this embodiment, home assistant application 132 accesses socials channels to identify the interactions between the privileged requestor and the secondary requestor. Home assistant application 132 based, at least in part, on the identification of the social channel interaction between the privileged requestor and the secondary requestor operates to approve or deny the request made by the secondary requestor. In some embodiments, home assistant application determines based, at least in part, on the identification of the social channel interaction between the privileged requestor and the secondary requestor, that to approve the request made by the secondary requestor the privileged requestor must communicate a permission to home assistant application 132. In this embodiment, home assistant application 132 communicates an authorization request to the privileged requestor, requesting the privileged requestor to approve or deny the data request made by the secondary requestor. In various embodiments, home assistant application 132 receives an approval by the privileged requestor, home assistant application 132 approves the request by the secondary requestor and accesses the data stored on database 134. In some embodiments, home assistant application 132 receives a denial by the privileged requestor, home assistant application 132 denies the request by the secondary requestor and generates a denial message and communicates the denial message to client application 122 with program instructions to communicate the denial message to the secondary requestor. Client application 122 utilizing text to speech technology and a speaker communicates the denial message to the secondary requestor.

In various embodiments of the present invention, home assistant application 132 generates a question that includes, but is not limited to, requesting the privileged requestor to respond (i) affirmatively or (ii) deny home assistant application 132 to continuously monitor and receive environment data from various users within a threshold level of proximity to client device 120. In various embodiments, the privileged requestor affirms home assistant application 132 to continuously monitor and receive environment data from a threshold level of proximity of client device 120 or its peripheral components, including but is not limited to, wired and wireless microphones, etc., as described below. In other embodiments, the privileged requestor denies home assistant application 132 to continuously monitor and receive environment data from a threshold level of proximity of client device 120 or its peripheral components, including but is not limited to, wired and wireless microphones, etc. One having ordinary skill in the art would understand that threshold level of proximity includes, but is not limited to, any distance to client device 120 that an installed microphone that is capable of picking up any frequency level of sound and/or voice.

In various embodiments of the present invention, client device 120 operates to continuously monitor its environment for communications by (i) the privileged requestor and (ii) one or more secondary requestors. Home assistant application 132 communicates program instructions to client application 122 to monitor the environment and collect data, within a threshold level of proximity, from the environment for communications between (i) the privileged requestor and (ii) one or more secondary requestors by utilizing client device 120 or its peripheral components, including but is not limited to, wired and wireless microphones, etc; and further instructs client application 122 to communicate the environment data to home assistant application 132. One having ordinary skill in the art would understand that the threshold level of proximity includes, but is not limited to, any distance to client device 120 or its peripheral components, including but is not limited to, wired and wireless microphones, etc. that is capable of picking up any frequency level of volume and/or sound. Home assistant application 132 analyzes the environment data and identifies one or more sentiment criteria. Additionally, home assistant application 132 analyzes the one or more sentiment criteria and identifies that the one or more sentiment criteria applies to one or more secondary requestors based, at least in part, on the environment data collected. Home assistant application 132 generates one or more policy decisions based, at least in part, on (i) the one or more sentiment criteria and (ii) one or more secondary requestors that the one or more sentiment criteria applies to. Home assistant application 132 stores the sentiment criteria on database 134. Home assistant application 132 utilizes the sentiment criteria to further determine whether the privileged requestor would approve a request made by the secondary requestor based, at least in part, on one or more policy decisions not established by the privileged requestor.

In one embodiment and example, the privileged requestor (i) does not establish one or more policy decisions and/or (ii) establishes one or more policy decisions that do not apply to the request made by the secondary requestor. In this embodiment, home assistant application 132 receives a request by a secondary requestor, wherein home assistant application 132 retrieves the policy decisions stored on database 134. Additionally, home assistant application 132 determines that the privileged requestor (i) does not establish one or more policy decisions and/or (ii) establishes one or more policy decisions that do not apply to the request made by the secondary requestor. Based, at least in part, on the determination by home assistant application 132 that the privileged requestor (i) did not establish one or more policy decisions and/or (ii) that the one or more policy decisions established by the privileged requestor do not apply to the request made by the secondary requestor, home assistant application 132 analyzes the one or more sentiment criteria. In this embodiment and example, home assistant application 132 retrieves the sentiment criteria stored on database 134 and analyzes the one or more sentiment criteria to determine whether the privileged requestor would approve the request made by the secondary requestor. In various embodiments, home assistant application 132 determines based, at least in part, on the sentiment criteria, that the privileged requestor would approve the request made by the secondary requestor. Home assistant application 132 approves the request made by the secondary requestor and allows the secondary requestor access to data stored on database 134. In some embodiments, home assistant application 132 determines based, at least in part, on the sentiment criteria, that the privileged requestor would not approve the request by the secondary requestor and generates a denial message. Home assistant application 132 communicates the denial message to client application 122 with program instructions to communicate the denial message to the secondary requestor. Client application 122 utilizes text to speech technology and a speaker to communicate the denial message to the secondary requestor.

In various embodiments of the present invention, home assistant application 132 receives a verbal request by (i) the privileged requestor or (ii) at least, one secondary requestor. In one embodiment, home assistant application 132 receives a verbal request from the privileged requestor. Home assistant application 132 identifies the privileged requestor, as described above, and allows access to all data stored on database 134, additionally home assistant application 132 based, at least in part, on the identification of the privileged requestor, does not require authentication of the privileged requestor.

In one embodiment, home assistant application 132 receives a verbal request from a secondary requestor, as described above. Home assistant application 132 identifies the secondary requestor, as described above, and accesses database 134 to retrieve one or more policy decisions that apply to the secondary requestor. Home assistant application 132 analyzes the one or more policy decisions and determines the access that the secondary requestor is permitted to data stored on database 134 based, at least in part, on the one or more policy decisions. It is possible that home assistant application 132 determines there is no policy decision established by the privileged requestor that is applicable, at least, to the request made by the secondary requestor. Based on the determination that no policy decision is established, home assistant application 132 leverages social network channels and analyzes the social interactions between the privileged requestor and the secondary requestor to determine whether the privileged requestor would approve the request made by the secondary requestor based, at least in part, on if the privileged requestor (i) had established one or more policy decisions and/or (ii) if the privileged requestor was present when the secondary requestor made the request. One having ordinary skill in the art would understand that social channel interactions include, but are not limited to, whether the privileged requestor and the secondary requestor are (i) friends and/or (ii) following each other, the status of the relationship (i.e., marital, familial, friendship, etc.), whether the requestors appear frequently together in photographs, videos, etc., the amount of times each other, respectively, has "liked" another's post, etc.

Figure 2:
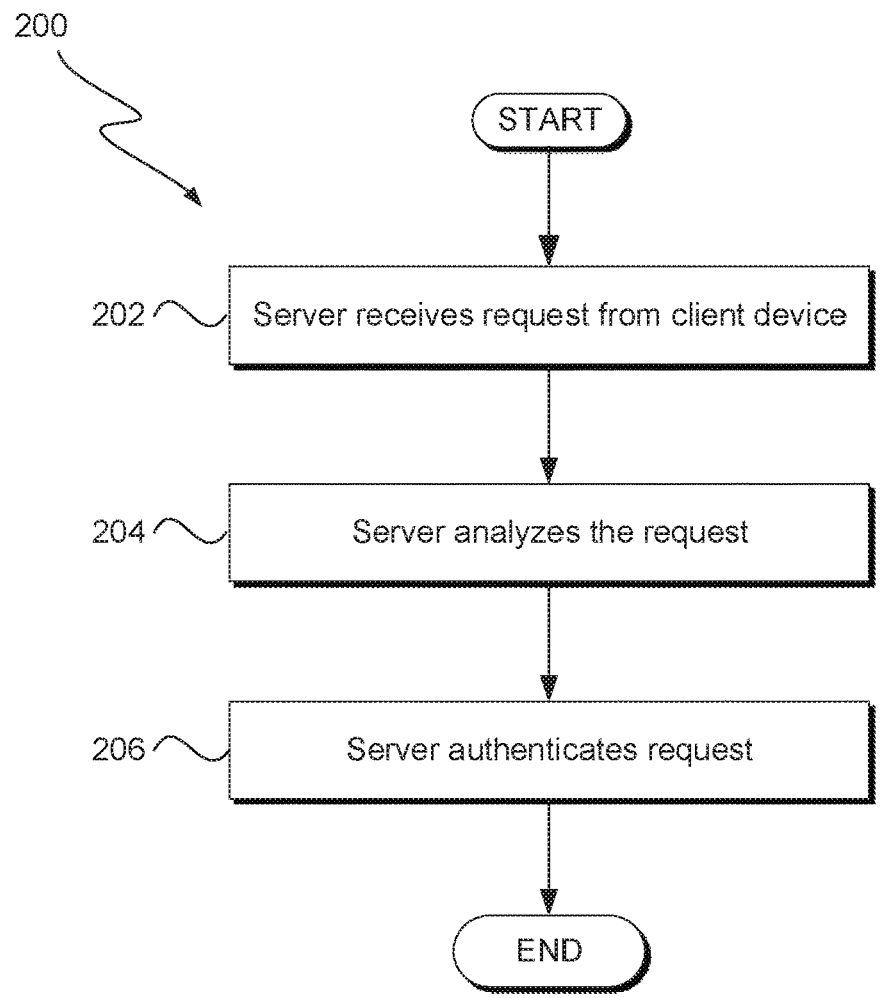
FIG. 2 illustrates operational processes of a security system executing on an intelligent assistant, on a computing device within the environment of FIG. 1, in accordance with an exemplary embodiment of the present invention.

FIG. 2 is a flowchart depicting operations for an intelligent assistant security system for computing environment 100, in accordance with an illustrative embodiment of the present invention. More specifically, FIG. 2, depicts combined overall operations 200, of home assistant application 132. In some embodiments, operations 200 represents logical operations of home assistant application 132, wherein home assistant application 132 represents interactions between logical computing devices communicating with SAN 130 and various other computing devices through network 110. It should be appreciated that FIG. 2 provides an illustration of one implementation and does not imply any limitations with regard to the environments in which different embodiments may be implemented. Many modifications to the depicted environment may be made. In one embodiment, the series of operations, in flowchart 200, can be terminated at any operation. In addition to the features previously mentioned, any operations of flowchart 200, can be resumed at any time.

In operation 202, home assistant application 132 of SAN 130 communicates with client device 120 and one or more of various computing devices, connected by network 110. In an alternative embodiment, client device 120 communicates with SAN 130, connected by network 110. SAN 130 utilizes home assistant application 132 to identify and analyze the data received from client device 120 and one or more computing devices. In various embodiments, home assistant application 132 communicates with client application 122 and requests the data that client application 122 verbally received from one or more users (i.e., privileged requestor, secondary requestor). In some embodiments, home assistant application 132 communicates a set of program instructions to client application 122. The program instructions instruct client application 122 to communicate the data, within a threshold period of time, that client application 122 receives when a user verbally communicates a request to client device 120. One having ordinary skill in the art would understand that a threshold period of time represents a duration of time (i.e., the moment client device 120 receives a verbal request, within 10 seconds of client device 120 receiving a verbal request, etc.).

In operation 204, home assistant application 132 analyzes the data received from computing device 120. In various embodiments, home assistant application 132 identifies (i) one or more policy decisions, (ii) environment data, and/or (iii) one or more requests and stores the data on database 134. In various embodiments, home assistant application 132 analyzes the one or more policy decisions and determines, at least, one secondary requestor the one or more policy decisions applies towards. In some embodiments, home assistant application 132 analyzes the environment data and identifies sentiment criteria from the environment data. Home assistant application 132 further analyzes the sentiment criteria to generate one or more policy decisions based, at least in part, on the sentiment criteria. Home assistant application 132 determines, at least, one secondary requestor the one or more policy decisions, generated from the sentiment criteria, applies towards. Home assistant application 132 stores the policy decisions, generated from the sentiment criteria, on database 134.

In one embodiment, home assistant application 132 receives a request from client application 122, wherein a user of client device 120 verbally communicated the request to client application 122. Home assistant application 132 analyzes the request and identifies the user (i.e., privileged requestor, secondary requestor, or unidentifiable requestor). In some embodiments, home assistant application 132 identifies the user as the privileged requestor and allows unfettered access to the data stored on database 134. In some embodiments, home assistant application 132 identifies the requestor as an unidentifiable requestor, as described above, and denies the request received. In some embodiments, home assistant application 132 identifies the user as, at least, one secondary requestor, wherein home assistant application 132 accesses database 134 and identifies, at least, one or more policy decisions that are applicable to the, at least, one secondary requestor. Home assistant application 132 retrieves the, at least, one or more policy decisions and determines whether the, at least, one or more policy decisions is applicable to the request made by the, at least, one secondary requestor. In one embodiment and example, home assistant application 132 determines that one or more policy decisions apply to the request made by the, at least, one secondary requestor. Home assistant application 132 analyzes the request and the policy decisions to determine whether home assistant application 132 approves the request made by the, at least, one secondary requestor.

In operation 206, home assistant application 132 analyzes the request and, at least, one or more policy decisions and determines whether or not to approve the request made by the, at least, one secondary requestor. In some embodiments, home assistant application 132 based, at least in part, on the analyzation of the request, a predicted response of the privileged requestor, and one or more policy decisions, determines that home assistant application 132 approves the request. In one embodiment home assistant application 132 based, at least in part, on the analyzation of the request and one or more policy decisions determines that (i) home assistant application 132 cannot approve the request (i.e., denies the request) or (ii) that the one or more policy decisions are not applicable to the verbal request received from the secondary requestor.

In some scenarios and embodiments, home assistant application 132 determines that (i) home assistant application 132 cannot approve the request, home assistant application 132 generates a denial message and communicates the denial message to client application 122 with program instructions to instruct client application 122 to communicate the denial message to the, at least, one secondary requestor.

In some scenarios and embodiments, home assistant application 132 determines that (ii) that the one or more policy decisions are not applicable to the verbal request received from the secondary requestor. Home assistant application 132 accesses social media channels and environment data stored on database 134 and retrieves (i) social interaction data between the secondary requestor and the privileged requestor and (ii) sentiment criteria. In some embodiments, home assistant application 132 based, at least in part, on the (i) social interaction data between the secondary requestor and the privileged requestor and (ii) sentiment criteria, determines, as described above, to approve the request made by the secondary requestor and allows access to data stored on database 134 based, at least in part, on the content of the request made by the secondary requestor. In various embodiments, home assistant application 132 based, at least in part, on the (i) social interaction data between the secondary requestor and the privileged requestor and (ii) sentiment criteria, determines, as described above, to deny the request made by the secondary requestor. Home assistant application 132 generates a denial message and communicates the denial message to client application 122 with a set of program instructions to instruct client application 122 to communicate the denial message to the, at least, one secondary requestor.

Figure 3:
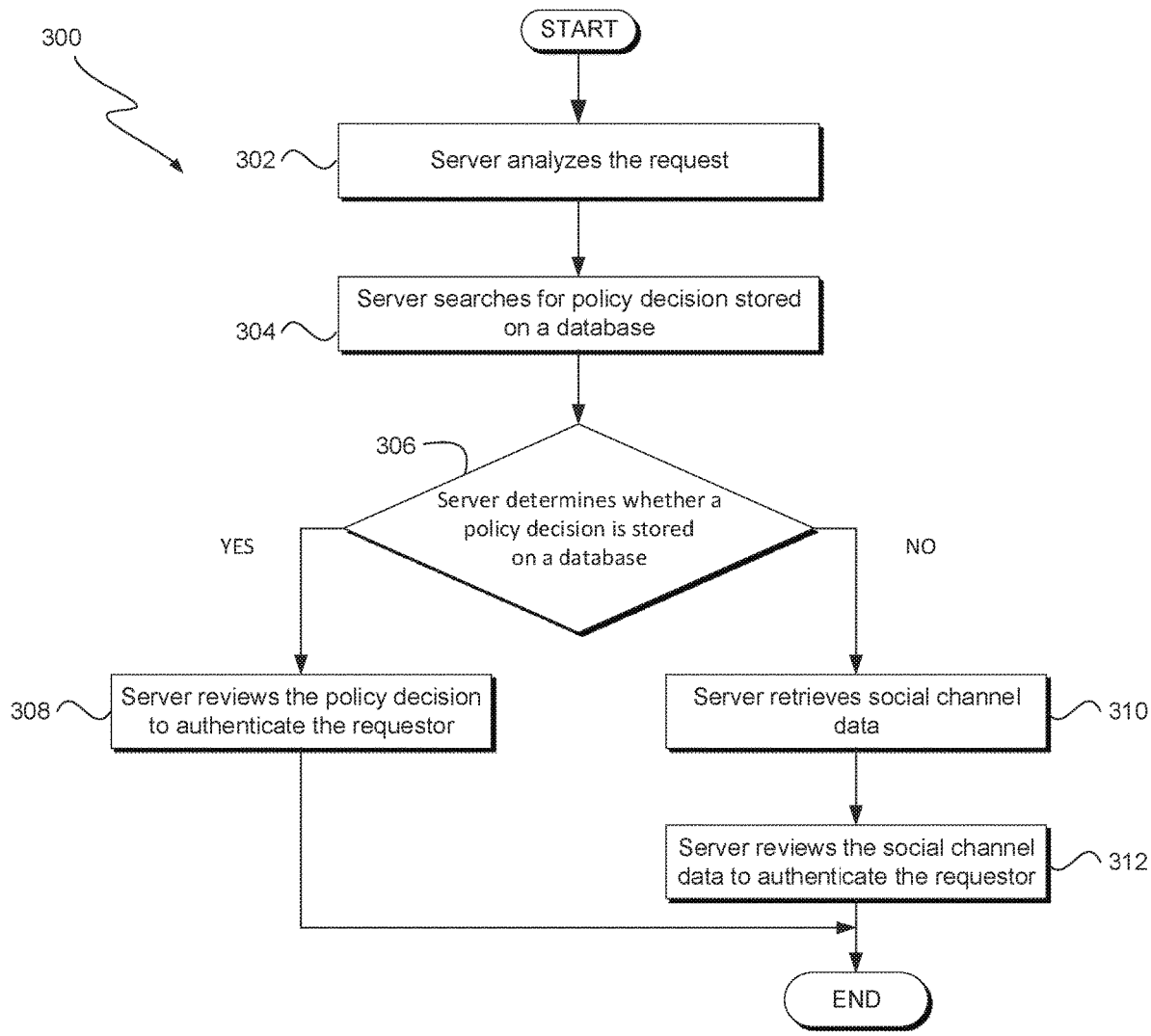
FIG. 3 illustrates operational processes of a security system authorizing a secondary user of an intelligent assistant, on a computing device within the environment of FIG. 1, in accordance with an exemplary embodiment of the present invention.

FIG. 3 depicts a flowchart depicting operations for an intelligent assistant to review a verbal request for computing environment 100, in accordance with an illustrative embodiment of the present invention. More specifically, FIG. 3, depicts combined overall operations, 300, of home assistant application 132. In some embodiments, operation 300 represents logical operations of home assistant application 132, wherein client application 122 represents interactions between logical units executing on SAN 130. Further, operations 300 can include a portion or all of combined overall operations of 200. It should be appreciated that FIG. 3 provides an illustration of one implementation and does not imply any limitations with regard to the environments in which different embodiments may be implemented. Many modifications to the depicted environment may be made. In one embodiment of flowchart 300, the series of operations can be performed in any order. In another embodiment, the series of operations, of flowchart 300, can be performed simultaneously. Additionally, the series of operation, in flowchart 300, can be terminated at any operation. In addition to the features previously mentioned, any operations, of flowchart 300, can be resumed at any time.

In operation 302, home assistant application 132 receives a verbal request from client application 122, wherein a user (i.e., privileged requestor, secondary requestor, or unidentifiable requestor) communicated the verbal request. As recognized above, home assistant application 132 analyzes the verbal request to identify the context of the request received from a user. In some embodiments of the present invention, home assistant application 132 identifies the context of the request and accesses the data to retrieve one or more policy decisions based, at least in part, on the user who communicated the verbal request (i.e., secondary requestor or unidentifiable requestor). In an alternative embodiment, home assistant application 132 cannot identify the context of the request and (i) denies the request communicated by the user or (ii) generates a response requesting the user re-communicate the verbal request. In various embodiments, home assistant application 132 identifies that the user is a privileged requestor and allows unfettered access to the data stored on database 134.

In operation 304, based, at least in part, on the analysis of the verbal request received by home assistant application 132. In one embodiment, home assistant application 132 identifies that the verbal request was communicated by a secondary requestor. Home assistant application 132 accesses database 134 and retrieves (i) one or more policy decisions and/or (ii) sentiment criteria. Home assistant application 132 analyzes the (i) one or more policy decisions and/or (ii) sentiment criteria based, at least in part, on the verbal request communicated by the secondary requestor.

If home assistant application 132 determines that the, at least, (i) one or more policy decisions or (ii) sentiment criteria are applicable to the verbal request communicated by the, at least, one secondary requestor (decision 306, YES branch), home assistant application analyzes the (i) at least, one or more policy decisions or (ii) sentiment criteria in view of the verbal request to authenticate the verbal request communicated by the secondary requestor. For example, home assistant application 132 receives a verbal request communicated from the secondary requestor and home assistant application 132 determines whether one or more policy decisions are applicable to the content of the verbal request. Additionally, home assistant application 132 retrieves sentiment criteria stored on database 134 and analyzes the sentiment criteria to determine whether one or more policy decisions are generated from the sentiment criteria, as described above. In some embodiments, home assistant application 132 determines that one or more policy decisions were generated from the sentiment criteria and are applicable to the content of the verbal request. In general, home assistant application 132 analyzes the (i) one or more policy decisions and (ii) sentiment criteria and authenticates the secondary requestor based, at least in part, on the (i) one or more policy decisions and (ii) sentiment criteria (operation 308). Alternatively, in some embodiments, home assistant application 132 analyzes the (i) one or more policy decisions and (ii) sentiment criteria and denies the secondary requestor based, at least in part, on the (i) one or more policy decisions and (ii) sentiment criteria (operation 308). If home assistant application 132 determines that there is no (i) at least, one or more policy decisions or (ii) sentiment criteria that is applicable to the verbal request made by the secondary requestor (decision 306, NO branch), then home assistant application 132 accesses social media channels to authenticate the verbal request received from the secondary requestor. In various embodiments, home assistant application 132 access social media channels and retrieves data that includes, but is not limited to, social channel interactions between the privileged requestor and the, at least, one secondary requestor (operation 310).

In operation 312, home assistant application 132 analyzes the social channel interaction data to authenticate the secondary requestor. In various embodiments, home assistant application 132 analyzes the data, as described above, and determines based, at least in part, on whether (i) the privileged requestor was present or (ii) the privileged requestor established one or more policy decisions, if the privileged requestor would approve the request communicated by the secondary requestor. In some embodiments, home assistant application 132 determines based, at least in part, on the analysis of social channel interaction data, to authenticate the request made by the secondary requestor. In various embodiments, home assistant application 132 determines based, at least in part, on the analysis of the social channel interaction data, to deny the request made by the secondary requestor. For example, in some embodiments, home assistant application 132 receives a verbal request from the secondary requestor for media playback of a specific song. Home assistant application 132 based, at least in part, on the operations of flowchart 300, determines to authenticate the request communicated by the secondary requestor, and home assistant application 132 communicates the data for the specific song to client application 122 with a set of program instructions to play the specific song. In one embodiment, home assistant application 132 receives a verbal request from the secondary requestor for the purchase of a television. Home assistant application 132 based, at least in part, on the operations of flowchart 300, determines to deny the request communicated by the secondary requestor, and home assistant application 132 generates a denial message and communicates the denial message to client application 122 with a set of program instructions to instruct client application 122 to communicate the denial message to the secondary requestor. In yet, another alternative embodiment, home assistant application 132 receives a verbal request from the secondary requestor for the purchase of a television. Home assistant application 132, based at least in part, on (i) the operations of flowchart 300 and (ii) one or more policy decisions established by the privileged requestor, determines that the privileged requestor established one or more policy decisions allowing the secondary requestor to make purchases up to a threshold value (e.g., $500) and any purchases exceeding the threshold value required approval from the privileged requestor. Based, at least in part, on the one or more policy decisions, home assistant application 132 authenticates the request made by the secondary requestor and processes the purchase of the television. Home assistant application 132 generates a message indicating the purchase request communicated by the secondary requestor and the authentication by home assistant application 132, and home assistant application 132 stores the message on database 134 for access later by (i) the privileged requestor and/or (ii) the secondary requestor.

Figure 4:
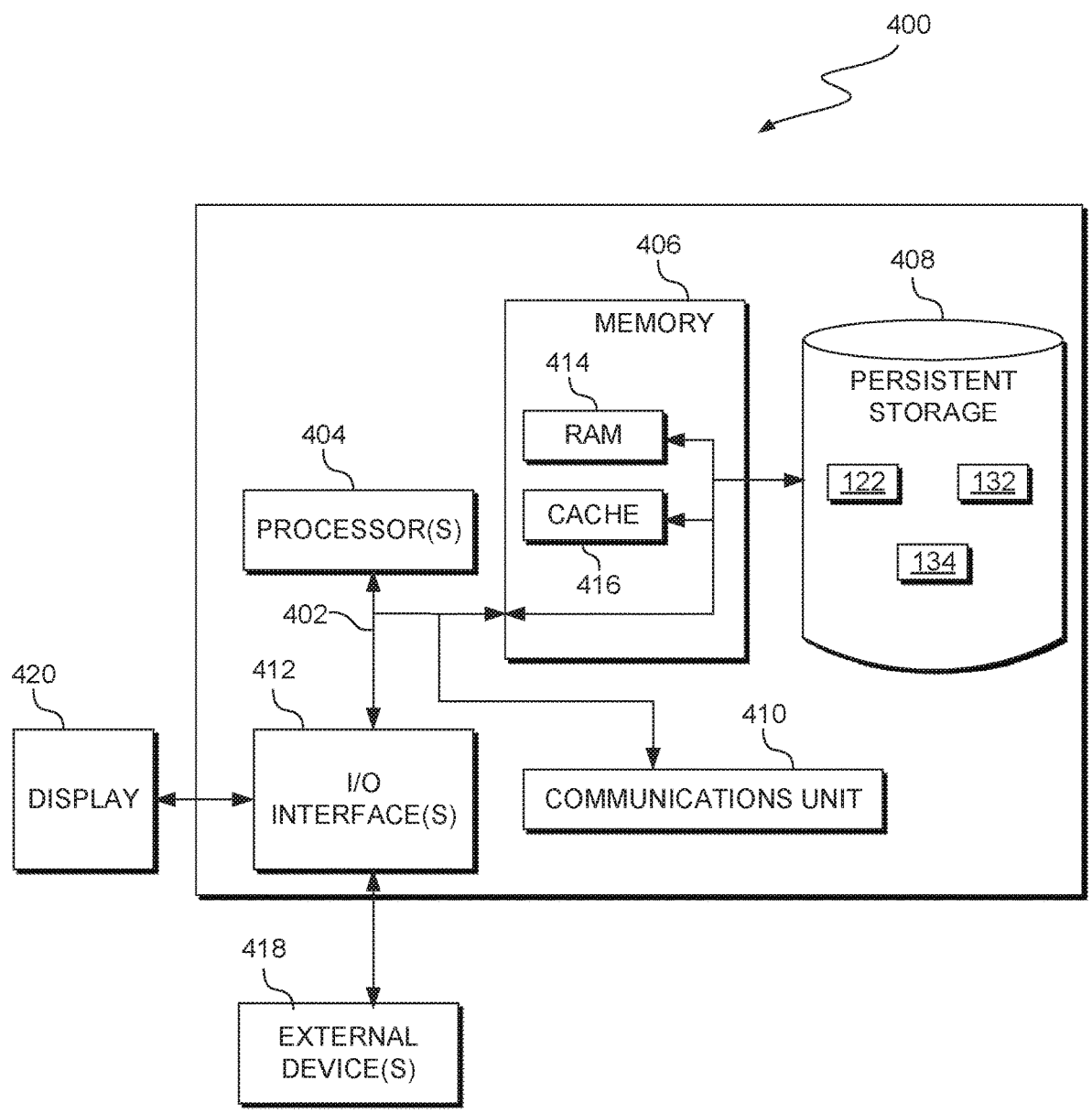
FIG. 4 depicts a block diagram of components of one or more computing devices within the computing environment depicted in FIG. 1, in accordance with an exemplary embodiment of the present invention.

FIG. 4 depicts a block diagram, 400, of components of client device 120 and SAN 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client device 120 and SAN 130 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Client application 122, home assistant application 132, and database 134 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Client application 122, home assistant application 132, and database 134 may be downloaded to persistent storage 408 through communications unit 410.

I/O interface(s) 412 allows for input and output of data with other devices that may be connected to client device 120 and SAN 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Client application 122, home assistant application 132, and database 134 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

Figure 5:
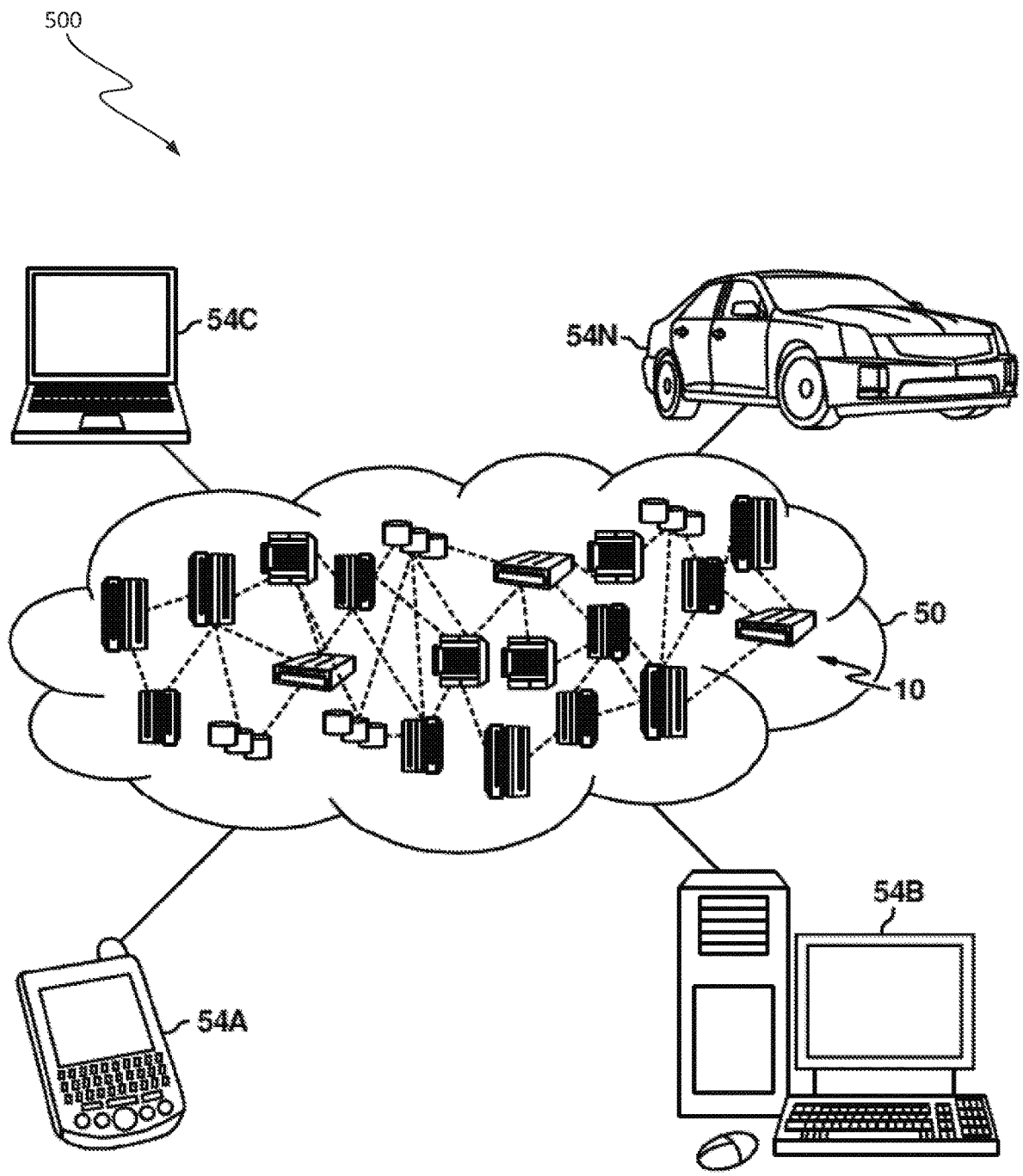
FIG. 5 depicts a cloud computing environment according to at least one embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
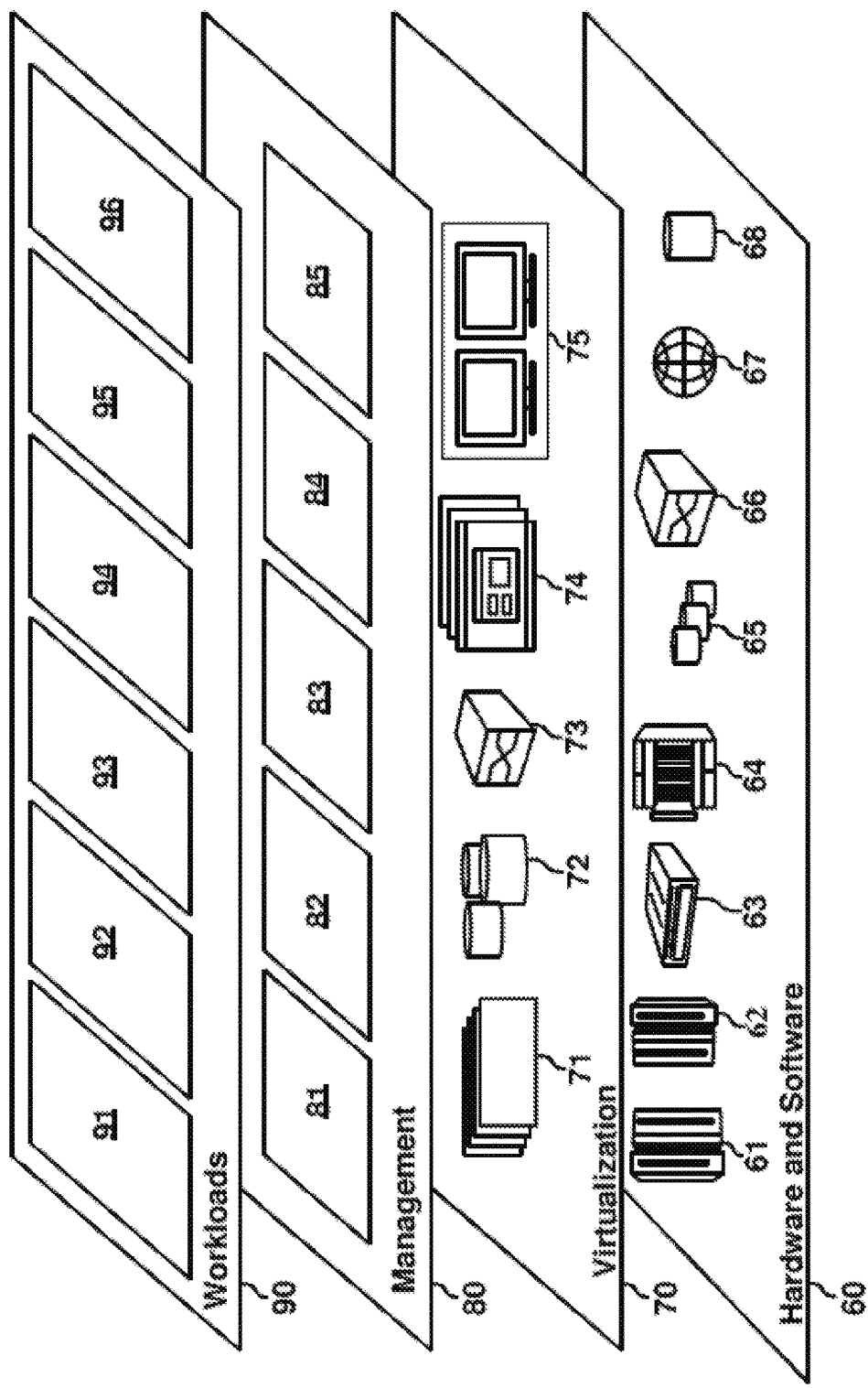
FIG. 6 depicts abstraction model layers according to at least one embodiment of the present invention.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:

receiving, by one or more processors, communicated data comprising a data request from a user within a threshold level of proximity of an intelligent assistant;

determining, by the one or more processors, an identity of the user based, in part, on the communicated data;

analyzing, by the one or more processors, one or more social media contents of one or more social media channels between (i) a privileged user and (ii) the user;

determining, by the one or more processors, a predicted response of the privileged user to the data request, wherein the predicted response indicates whether to authorize the data request and is based, at least in part, on the one or more social media contents of the one or more social media channels between (i) the privileged user and (ii) the user;

authorizing, by the one or more processors, the data request based, at least in part, on the predicted response;

executing, by the one or more processors, the data request; and communicating, by the one or more processors, the predicted response to the user via the intelligent assistant.

2. The computer-implemented method of claim 1, wherein authorizing, by the one or more processors, the data request based, at least in part, on the predicted response includes authorizing that the privileged user has access to the intelligent assistant.

3. The computer-implemented method of claim 1, the method further comprising:

receiving, by one or more processors, data, communicated from the privileged user;

identifying, by the one or more processors, (i) content of the communicated data; and generating, by the one or more processors, one or more policy decisions for authorizing data requests, wherein the one or more policy decisions are associated with the content of the communicated data.

4. The computer-implemented method of claim 3, the method further comprising:

analyzing, by the one or more processors, (i) the one or more policy decisions and (ii) the data request.

5. The computer-implemented method of claim 1, the method further comprising:

identifying, by the one or more processors, one or more policy decisions that are directed towards the user, wherein the authorizing of the data request is further based, at least in part, on the one or more policy decisions that are directed towards the user.

6. The computer-implemented method of claim 1, the method further comprising:

identifying, by the one or more processors, a social media connection between (i) the privileged user and (ii) the user; and retrieving, by the one or more processors, the one or more social media channels between (i) the privileged user and (ii) the user.

7. A computer program, the computer program product comprising:

one or more computer-readable storage media and program instructions stored on the one or more computer-readable storage media, the stored program instructions comprising:

program instructions to receive communicated data comprising a data request from a user within a threshold level of proximity of an intelligent assistant;

program instructions to determine an identity of the user based, in part, on the communicated data;

program instructions to analyze one or more social media contents of one or more social media channels between (i) a privileged user and (ii) the user;

program instructions to determine a predicted response of the privileged user to the data request, wherein the predicted response indicates whether to authorize the data request and is based, at least in part, on the one or more social media contents of the one or more social media channels between (i) the privileged user and (ii) the user;

program instructions to authorize the data request based, at least in part, on the predicted response;

program instructions to execute the data request; and program instructions to communicate the predicted response to the user via the intelligent assistant.

8. The computer program product of claim 7, wherein instructions to authorize the data request based, at least in part, on the predicted response comprise instructions to authorize that the privileged user has access to the intelligent assistant.

9. The computer program product of claim 7, the stored program instructions further comprising:

program instructions to receive data, communicated from the privileged user;

program instructions to identify content of the communicated data; and program instructions to generate one or more policy decisions for authorizing data requests, wherein the one or more policy decisions are associated with the content of the communicated data.

10. The computer program product of claim 9, the stored program instructions further comprising:

program instructions to analyze (i) one or more policy decisions directed towards the user and (ii) the data request.

11. The computer program product of claim 10, the stored program instructions further comprising:

program instructions to identify a social media connection between (i) the privileged user and (ii) the user; and program instructions to retrieve the one or more social media channels between (i) the user requestor and (ii) the user.

12. The computer program product of claim 7, the stored program instructions further comprising:

program instructions to identify one or more policy decisions that are directed towards the user, wherein the authorizing of the data request is further based, at least in part, on the one or more policy decisions that are directed towards the user.

13. A computer system, the computer system comprising:

one or more computer processors;

one or more computer readable storage medium; and program instructions stored on the computer readable storage medium for execution by at least one of the one or more processors, the stored program instructions comprising:

program instructions to receive communicated data comprising a data request from a user within a threshold level of proximity of an intelligent assistant;

program instructions to determine an identity of the user based, in part, on the communicated data;

program instructions to analyze one or more social media contents of one or more social media channels between (i) a privileged user and (ii) the user;

program instructions to determine a predicted response of the privileged user to the data request, wherein the predicted response indicates whether to authorize the data request and is based, at least in part, on the one or more social media contents of the one or more social media channels between (i) the privileged user and (ii) the user;

program instructions to authorize the data request based, at least in part, on the predicted response;

program instructions to execute the data request; and program instructions to communicate the predicted response to the user via the intelligent assistant.

14. The computer system of claim 13, wherein instructions to authorize the data request based, at least in part, on the predicted response comprise instructions to authorize that the privileged user has access to the intelligent assistant.

15. The computer system of claim 13, the stored program instructions further comprising:

program instructions to receive data, communicated from the privileged user;

program instructions to identify content of the communicated data; and program instructions to generate one or more policy decisions for authorizing data requests, wherein the one or more policy decisions are associated with the content of the communicated data.

16. The computer system of claim 15, the stored program instructions further comprising:

program instructions to analyze the one or more policy decisions and (ii) the data request.

17. The computer system of claim 13, the stored program instructions further comprising:

program instructions to identify one or more policy decisions that are directed towards the user wherein the authorizing of the data request is further based, at least in part, on the one or more policy decisions that are directed towards the user.

* * * * *